United States Patent
Bammert et al.

(10) Patent No.: US 8,531,313 B2
(45) Date of Patent: Sep. 10, 2013

(54) METHOD FOR OPERATING A DRIVER ASSISTANCE SYSTEM WHEN PARKING A VEHICLE IN A PARKING SPACE

(75) Inventors: Jens Bammert, Stuttgart (DE); Klaus Hoffsommer, Bietigheim-Bissingen (DE); Simon Kossmann, Weissach (DE); Vsevolod Vovkushevsky, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 357 days.

(21) Appl. No.: 12/990,254

(22) PCT Filed: May 19, 2009

(86) PCT No.: PCT/EP2009/003589
§ 371 (c)(1),
(2), (4) Date: Oct. 29, 2010

(87) PCT Pub. No.: WO2009/141133
PCT Pub. Date: Nov. 26, 2009

(65) Prior Publication Data
US 2011/0043380 A1 Feb. 24, 2011

(30) Foreign Application Priority Data
May 23, 2008 (DE) .......... 10 2008 024 964

(51) Int. Cl.
*G08G 1/14* (2006.01)
(52) U.S. Cl.
USPC .......... 340/932.2; 340/436; 340/448
(58) Field of Classification Search
USPC .......... 340/932.2, 901–903, 933, 425.5, 340/435–436, 438–439, 441, 443–448
See application file for complete search history.

(56) References Cited

U.S. PATENT DOCUMENTS

| 6,097,314 A * | 8/2000 | Desens et al. ............. 340/932.2 |
| 7,425,903 B2 * | 9/2008 | Boss et al. ................. 340/902 |

(Continued)

FOREIGN PATENT DOCUMENTS

| DE | 10 2005 032096 A1 | 1/2007 |
| EP | 1 028 026 A2 | 8/2000 |
| EP | 1 887 540 A1 | 2/2008 |
| WO | 2004/053812 A1 | 6/2004 |

OTHER PUBLICATIONS

International Search Report w/translation from PCT/EP2009/003589 dated Sep. 2, 2009 (6 pages).

*Primary Examiner* — Daniel Previl
(74) *Attorney, Agent, or Firm* — Osha Liang LLP

(57) ABSTRACT

The invention describes a method for the operation of a driving assistance system when parking a vehicle (01) in a lateral parking space (02) along a carriageway, in which below a particular activation speed and during the search for a parking space, possible parking spaces (02) are measured and an information item indicating that a suitable parking space (02) has been found is output to the driver for a parking space (02) of sufficient length for the vehicle (01), wherein the rear area (03) of the vehicle (01) is monitored when the activation speed is undershot during the search for a parking space, and the driver of the vehicle (01) is warned of a potential shunt accident as a result of a sudden braking maneuver when there is a following vehicle (05) in the rear area (03). In addition, it describes a driving assistance apparatus for carrying out the method and a computer program product which prompts a microprocessor having associated memory means to carry out the method.

11 Claims, 1 Drawing Sheet

(56) References Cited

U.S. PATENT DOCUMENTS

| | | |
|---|---|---|
| 7,739,046 B2* | 6/2010 | Satonaka et al. ............. 701/300 |
| 2003/0162536 A1* | 8/2003 | Panico ......................... 455/422 |
| 2004/0119610 A1* | 6/2004 | Maemura et al. .......... 340/932.2 |
| 2006/0080005 A1* | 4/2006 | Lee et al. ......................... 701/1 |
| 2007/0146164 A1* | 6/2007 | Schmid et al. ............. 340/932.2 |
| 2007/0252723 A1 | 11/2007 | Boss et al. |
| 2007/0268157 A1* | 11/2007 | Hess et al. ................. 340/932.2 |

\* cited by examiner

METHOD FOR OPERATING A DRIVER ASSISTANCE SYSTEM WHEN PARKING A VEHICLE IN A PARKING SPACE

PRIOR ART

The invention relates to the field of short-range identification or to the field of surroundings sensing for vehicles. In particular, the invention relates to a method for the operation of a driving assistance system when parking a vehicle in a parking space in accordance with the preamble of claim 1, to a driving assistance apparatus in accordance with the preamble of claim 9 and to a computer program product in accordance with the preamble of claim 11.

Known driving assistance apparatus for assisting a driver of a vehicle in parking, subsequently called parking systems for short, provide the driver with active assistance in parking in a parking space along the side of the carriageway. In this context, the parking system uses sensors, for example fitted on the sides of the vehicle, for example ultrasound sensors (Ultrasonic Park Assist sensors; UPA-sensors), to measure a possible parking space, calculates a parking trajectory from the space data and steers the vehicle into the parking space, for example by means of active steering intervention or by means of driving instructions to the driver. During the parking operation or when parking, the distance to objects delimiting the parking space is monitored by the ultrasound sensors.

So that a desired measurement accuracy is not lost, a particular maximum speed for the measurement must not be exceeded for the duration of the measurement of a parking space or during the search for a parking space when driving past vehicles parked along the carriageway. This maximum speed is usually below a permitted maximum speed on arterial roads or main roads. This presents the hazard that vehicles traveling behind a vehicle which is searching for a parking space are very close together and are surprised in the event of sudden braking maneuvers by the vehicle in front and cannot brake in good time.

It can therefore be regarded as an object of the invention to develop a method which allows shunt accidents during the search for a parking space to be avoided.

DISCLOSURE OF THE INVENTION

The invention achieves the object by means of a method for the operation of a driving assistance system when parking a vehicle in a lateral parking space along a carriageway, which method involves the possible parking spaces being measured below a particular activation speed during the search for a parking space and an information item indicating a suitable or valid parking space which has been found being output to the driver of the vehicle for a parking space of sufficient length for the vehicle. In this context, the invention provides for the rear area of the vehicle to be monitored when the activation speed is undershot during the search for a parking space, and for the driver of the vehicle to be warned of potential shunt accidents as a result of sudden braking maneuvers when there is a following vehicle approaching or in the rear area, for example.

If a suitable parking space is being reported to the driver of the vehicle and the area behind the vehicle is clear, the driver of the vehicle can immediately perform a braking maneuver with a desired delay. However, if a suitable parking space is found and the area behind the vehicle is not clear, the driver of the vehicle is warned in good time about a sudden braking maneuver, so that he initiates the braking maneuver only with caution.

Advantages of the invention arise particularly from the fact that it reduces the risk of shunt accidents as a result of sudden braking maneuvers while a parking assistant or parking system is active.

Preferably, when the activation speed is undershot during the search for a parking space, every suitable parking space is reported if no potential shunt vehicles or no following vehicle which is approaching or in the rear area, for example, is/are identified behind the vehicle, in which case the driver of the vehicle is able to perform a necessary braking maneuver without restriction.

In one advantageous refinement of the method according to the invention, if potential shunt vehicles or a following vehicle which is approaching or in the rear area, for example, is/are identified behind the vehicle, a suitable parking space is reported to the driver with simultaneous warning of a potential shunt accident as a result of a sudden braking maneuver when the activation speed is undershot during the search for a parking space. The driver of the vehicle must accordingly react to the warning and cannot perform the necessary braking maneuver without restriction.

In another advantageous refinement of the method according to the invention, when a collision hazard is identified as a result of a vehicle which is following or in the rear area or when potential shunt vehicles or a following vehicle which is approaching or in the rear area, for example, is/are identified behind the vehicle, the following or trailing vehicle is informed about a possible imminent braking maneuver before a suitable parking space is actually reported.

In this case, it is conceivable for the information about a possible imminent braking maneuver to be provided by means of activation of the brake lights of the vehicle immediately after a suitable parking space has been identified, without any braking delay occurring. Preferably, the braking delay does not occur until the driver of the vehicle which is searching for a parking space initiates the braking maneuver.

It is likewise conceivable for the information about a possible imminent braking maneuver to be provided by means of vehicle-to-vehicle communication to the following vehicle.

In one particularly advantageous refinement of the method according to the invention, a suitable parking space is not reported if a collision hazard is identified as a result of a following vehicle or a vehicle which is in the rear area or if potential shunt vehicles or a following vehicle which is approaching or in the rear area, for example, is/are identified behind the vehicle.

One particularly advantageous refinement of the method according to the invention is characterized by the use of different presentations for parking spaces which are found when the rear area is clear and when it is not clear.

The invention or the method according to the invention can be advantageously applied particularly in conjunction with a driver assistance apparatus for assisting a driver of a vehicle in parking in a lateral parking space along a carriageway.

Such a parking assistance apparatus preferably comprises means for measuring and sensing lateral parking spaces along a carriageway, and for sensing following vehicles in a rear area of the vehicle, and a microprocessor which is connected to the means and which has associated memory means for calculating whether a measured and sensed parking space is suitable for the vehicle, and whether a sudden braking maneuver means that there is the threat of a potential shunt accident for a following vehicle which is approaching or in the rear area, for example, and also means for informing the driver of the vehicle about a suitable parking space and possibly about a potential shunt accident in the event of a sudden braking maneuver.

An advantageous use of the method according to the invention arises in conjunction with a driving assistance apparatus which allows guided parking or semi-automatic parking or fully-automatic parking.

One particularly advantageous refinement of the invention relates to a computer program product stored on a computer-usable medium, comprising computer-readable program means which, when the computer program product is executed on a microprocessor having associated memory means or on a computer, prompt said microprocessor or computer to carry out a method according to the invention which is described above.

BRIEF DESCRIPTION OF THE DRAWING

The invention is explained below with reference to the figures of the drawing, in which.

EMBODIMENT OF THE INVENTION

When a vehicle 01, shown in FIGS. 1 and 2, drops below an activation speed for a sensor system for measuring the vehicle surroundings, the surroundings sensing is activated. When the driver of the vehicle 01 then activates the parking assistant or the parking system of the vehicle 01, the driver is informed about valid parking spaces 02, i.e. about parking spaces 02 of sufficient length for the vehicle 01. At the same time, monitoring of an area 03 behind the vehicle 01 is activated.

Figure 1:
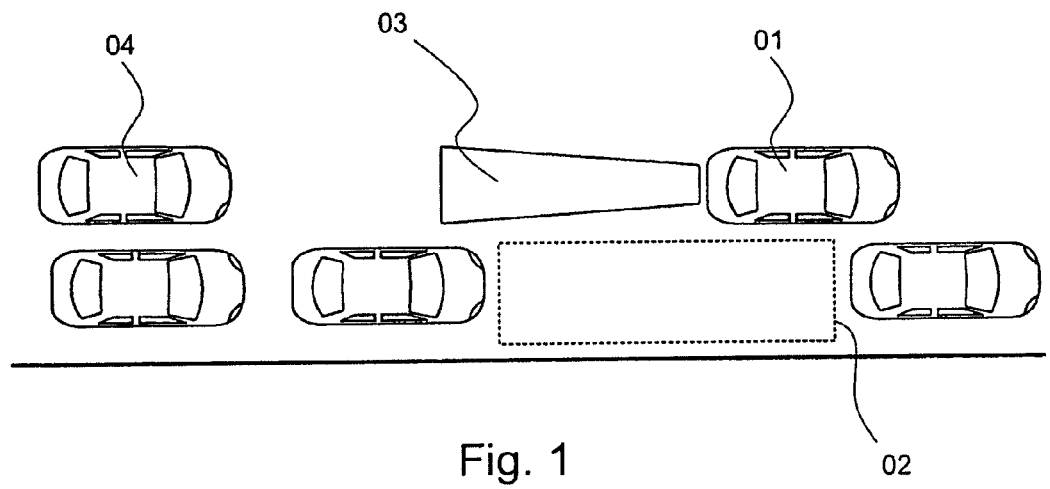
FIG. 1 shows a schematic illustration of a first situation during the search for a parking space below a particular activation speed, in which a monitored rear area is clear.

If a valid parking space 02 is reported to the driver of the vehicle 01 and the area 03 behind the vehicle 01 is clear, the driver of the vehicle 01 can immediately perform a braking maneuver with a desired delay (FIG. 1). However, if a valid parking space 02 is reported to the driver of the vehicle 01 and the area 03 behind the vehicle 01 is not clear, the driver of the vehicle 01 is warned in good time about a sudden braking maneuver, so that he initiates the braking maneuver only with caution.

Advantages of the invention arise particularly from the fact that this reduces the risk of shunt accidents as a result of sudden braking maneuvers while a parking assistant or a parking system is active.

FIG. 1 shows a situation in which the rear area 03 of the vehicle 01 which is searching for a parking space 02 is clear, i.e. a situation in which a vehicle 04 following the vehicle 01 is either outside the range of an appropriate sensor system monitoring the rear area 03 of the vehicle 01 or is at a sufficiently great distance from the vehicle 01. In the situation shown in FIG. 1, a parking assistant or parking system has been activated. This means that the parking space measurement and the rear monitoring are active. In this case, the speed of the vehicle 01 is below the permitted maximum speed.

If the parking system does not identify potential shunt vehicles behind the vehicle 01, the parking system reports every valid parking space 02 and the driver of the vehicle 01 is able to perform a necessary braking maneuver without restriction.

Figure 2:
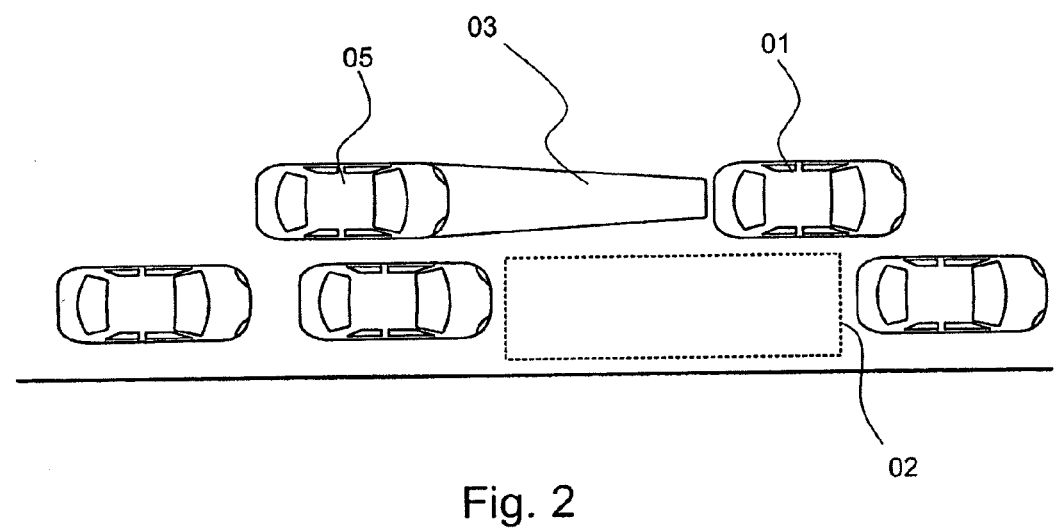
FIG. 2 shows a schematic illustration of a second situation during the search for a parking space below a particular activation speed, in which a monitored rear area is not clear.

FIG. 2 shows a situation in which the rear area 03 of the vehicle 01 which is searching for a parking space 02 is not clear, i.e. a situation in which a vehicle 04 following the vehicle 01 is either within the range of an appropriate sensor system monitoring the rear area 03 of the vehicle 01 or is below a minimum distance from the vehicle 01. In the situation shown in FIG. 1, a parking assistant or a parking system has been activated. This means that the parking space measurement and the rear monitoring are active. The speed of the vehicle 01 is below the permitted maximum speed.

When the parking system identifies a potential shunt vehicle 05 behind the vehicle 01, the parking system reports a valid parking space 02 and at the same time warns the driver of the vehicle 01 about too sudden a braking maneuver. The driver of the vehicle 01 must accordingly react to the warning and cannot perform a necessary braking maneuver without restriction.

In principle, it is conceivable for a parking assistance apparatus or a parking system which is carrying out the method according to the invention during the search for a parking space to inform the vehicle 05 traveling behind about an imminent braking maneuver, for example by virtue of brake lights being activated by the parking system immediately after a valid parking space 02 has been identified, but without a braking delay occurring, before a valid parking space 02 is actually reported when the risk of a collision as a result of a following vehicle 05 is identified. The braking delay does not occur until the driver of the vehicle 01 which is searching for a parking space 02 initiates the braking maneuver.

It is likewise conceivable for the parking system to use vehicle-to-vehicle communication to inform a trailing vehicle 04, 05 about the status that the parking assistant or the parking system is active, so that the driver of a following vehicle 04, 05 is informed or at least forewarned about possible braking maneuvers.

It is also conceivable for the parking system not to report the valid parking space 02 if the rear area 03 of the vehicle 01 is not clear.

In addition, it is conceivable to use different presentations for parking spaces 02 which are found when the rear area 03 is clear and when it is not clear.

The apparatus provided for monitoring the rear area (03) of the vehicle (01) may be an arrangement of ultrasound sensors, for example, which are arranged on a rear fender of the vehicle (01) as part of a parking aid which is present anyway. Such sensors are usually activated only when a reverse gear of the vehicle (01) is engaged. The method according to the invention now has provision for these sensors to be able to be activated when the parking space measurement is actually switched on.

In addition, radar sensors in a blind spot monitoring device of the vehicle (01) may also be provided for monitoring the rear area (03). These radar sensors are respectively arranged on the lateral wall of the vehicle, particularly in a corner area of the rear fender, and have a monitoring area which covers at least a lateral area behind the rear area (03) of the vehicle (01).

The invention claimed is:

1. A method for operation of a driving assistance system when parking a vehicle in a lateral parking space along a carriageway, comprising:
   measuring possible parking spaces during the search for a parking space below a particular activation speed;
   outputting an information item indicating that a suitable parking space has been found to the driver for the parking space of sufficient length for the vehicle;
   monitoring the rear area of the vehicle when the activation speed is undershot during the search for the parking space; and
   warning the driver of the vehicle of a potential shunt accident as a result of a sudden braking maneuver when there is a following vehicle in the rear area.

2. The method as claimed in claim 1, wherein, when no following vehicle is identified behind the vehicle, every suitable parking space is reported.

3. The method as claimed in claim 1, wherein, when the following vehicle is identified behind the vehicle, a suitable parking space is reported to the driver with simultaneous warning of the potential shunt accident as a result of the sudden braking maneuver.

4. The method as claimed in claim 1, wherein, when the following vehicle is identified behind the vehicle, the following vehicle is informed about a possible imminent braking maneuver before a suitable parking space is actually reported.

5. The method as claimed in claim 4, wherein the information about the possible imminent braking maneuver is provided by activation of the brake lights of the vehicle immediately after the suitable parking space has been identified.

6. The method as claimed in claim 4, wherein the information about the possible imminent braking maneuver is provided by vehicle-to-vehicle communication between the following vehicle and the vehicle.

7. The method as claimed in claim 1, wherein when the following vehicle is identified behind the vehicle, a suitable parking space is not reported.

8. The method as claimed in claim 1, wherein different presentations for parking spaces are reported based on whether the rear area is clear or not clear.

9. A driving assistance apparatus comprising:
a memory; and
a microprocessor for performing a method comprising:
  measuring and sensing lateral parking spaces along a carriageway,
  sensing following vehicles in a rear area of a vehicle, and
  calculating whether a measured and sensed parking space is suitable for the vehicle, and whether a sudden braking maneuver means that there is the threat of a potential shunt accident for a following vehicle,
wherein the driving assistance apparatus is configured to inform the driver of the vehicle about a suitable parking space and the potential shunt accident in the event of the sudden braking maneuver.

10. The driving assistance apparatus as claimed in claim 9, wherein the driving assistance apparatus allows one selected from a group consisting of a guided reversing out of a parking space, a semi-automatic reversing out of a parking space, or a fully automatic reversing out of a parking space.

11. A computer program product stored on a computer-usable medium, comprising computer-readable program means which, when the computer program product is executed on a microprocessor having associated memory means or on a computer, prompt said microprocessor or computer to carry out a method comprising:
measuring possible parking spaces during the search for a parking space below a particular activation speed;
outputting an information item indicating that a suitable parking space has been found to the driver for the parking space of sufficient length for the vehicle;
monitoring the rear area of the vehicle when the activation speed is undershot during the search for the parking space; and
warning the driver of the vehicle of a potential shunt accident as a result of a sudden braking maneuver when there is a following vehicle in the rear area.

* * * * *